(12) United States Patent  (10) Patent No.: US 7,052,142 B2
Gupta  (45) Date of Patent: May 30, 2006

(54) ENHANCED RESOLUTION PROJECTOR

(75) Inventor: Anurag Gupta, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/836,920

(22) Filed: Apr. 30, 2004

(65) Prior Publication Data
US 2005/0243290 A1 Nov. 3, 2005

(51) Int. Cl.
G03B 21/00 (2006.01)
G03B 21/28 (2006.01)
(52) U.S. Cl. .............................. 353/46; 353/51; 353/99
(58) Field of Classification Search .................. 353/46, 353/50–51, 99
See application file for complete search history.

(56) References Cited

U.S. PATENT DOCUMENTS

| 6,317,169 B1 * | 11/2001 | Smith .......................... 348/744 |
| 6,657,603 B1 * | 12/2003 | Demetrescu et al. .......... 353/46 |
| 6,888,582 B1 * | 5/2005 | Tominaga et al. .............. 349/5 |
| 2004/0027313 A1 | 2/2004 | Pate et al. |
| 2005/0134805 A1 * | 6/2005 | Conner et al. ................. 353/46 |

* cited by examiner

Primary Examiner—Christopher Mahoney

(57) ABSTRACT

A light projecting device including an image resolution enhancing mechanism that spatially offsets at least one pixel between an original pixel position and an offset pixel position. The image resolution enhancing mechanism includes a dual mirror mechanism to provide the spatial offset.

15 Claims, 9 Drawing Sheets

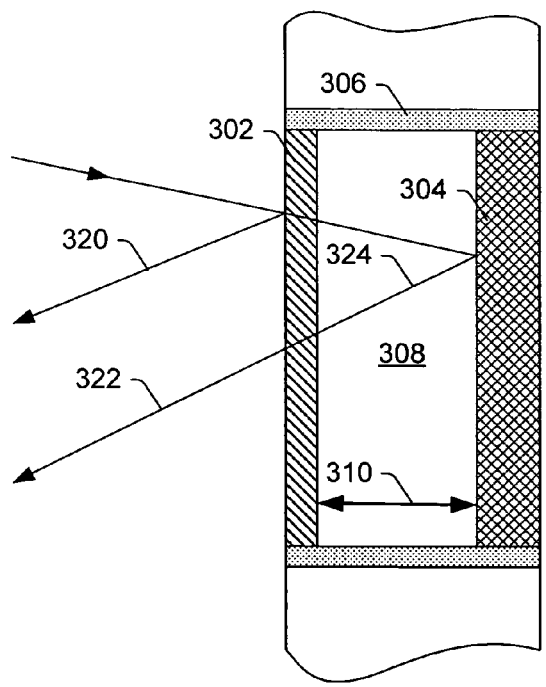
Fig. 3
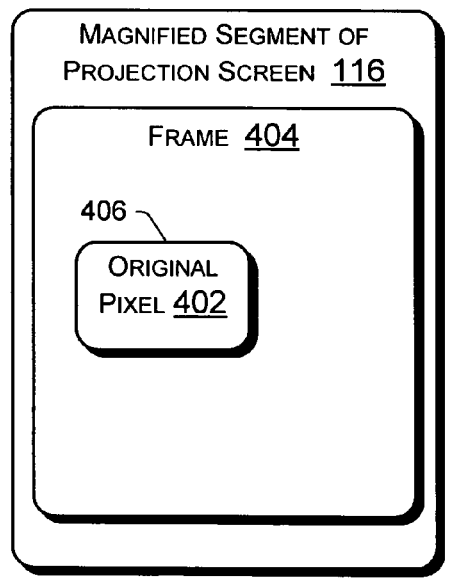 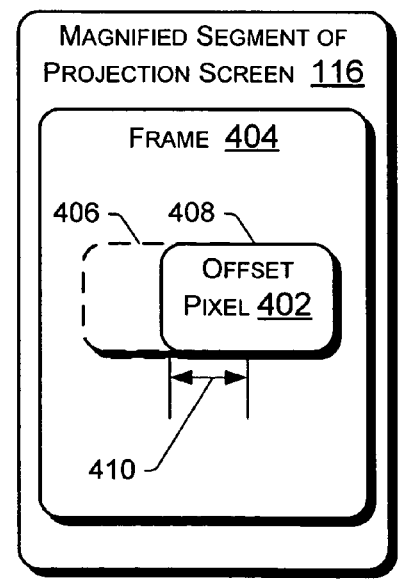
Fig. 4a  Fig. 4b

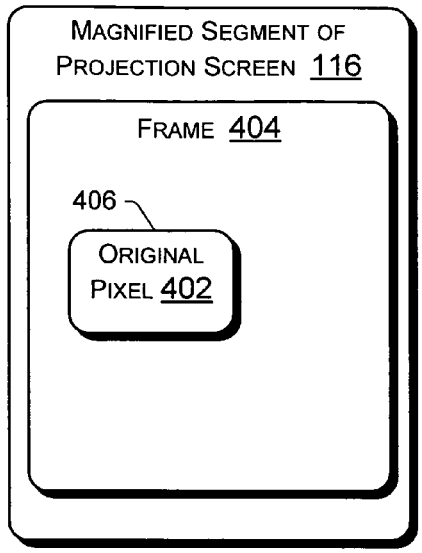
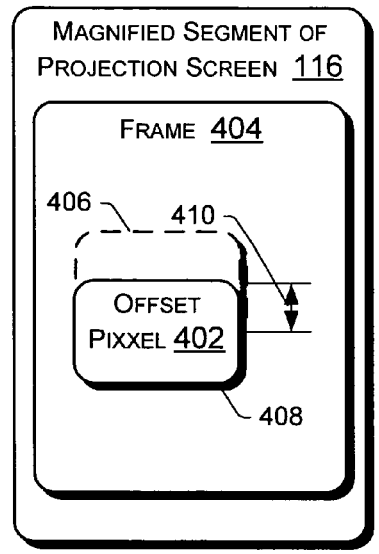
Fig. 5a          Fig. 5b
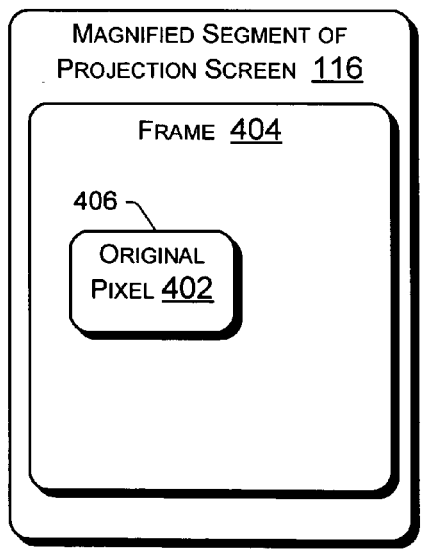
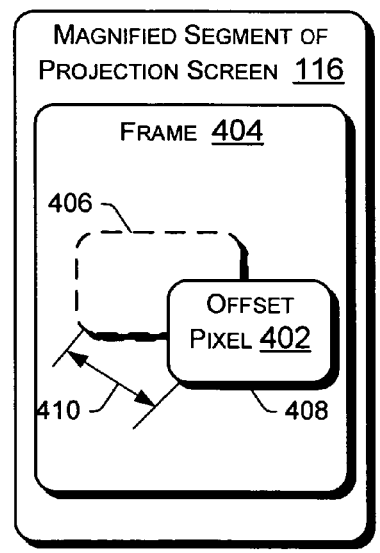
Fig. 6a          Fig. 6b

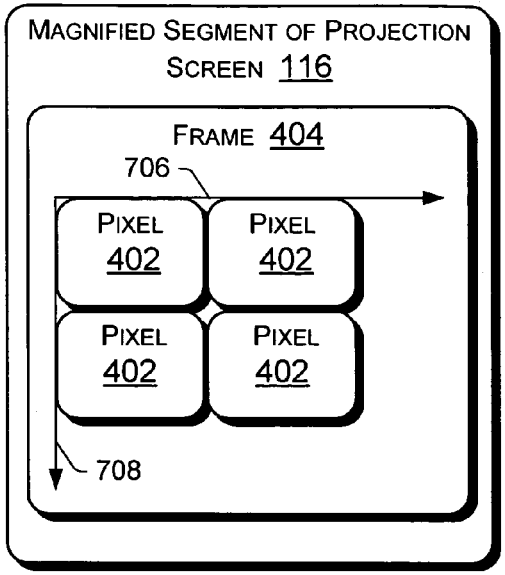
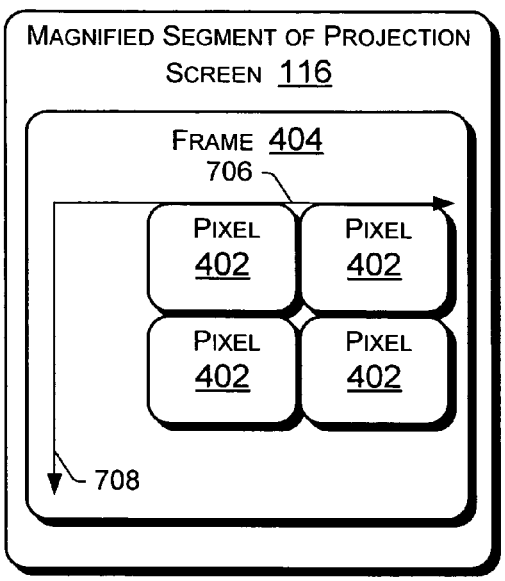
Fig. 7a  Fig. 7b
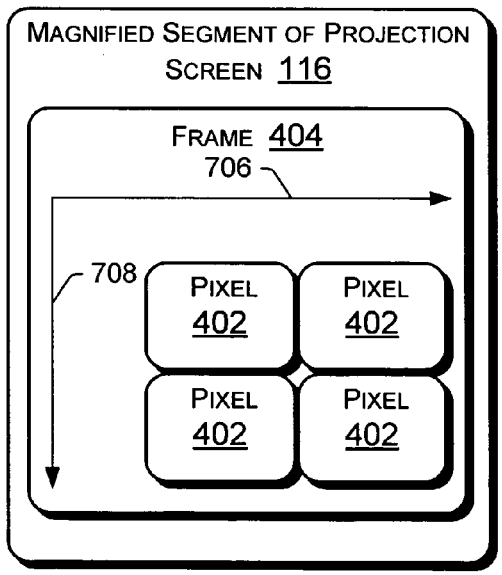
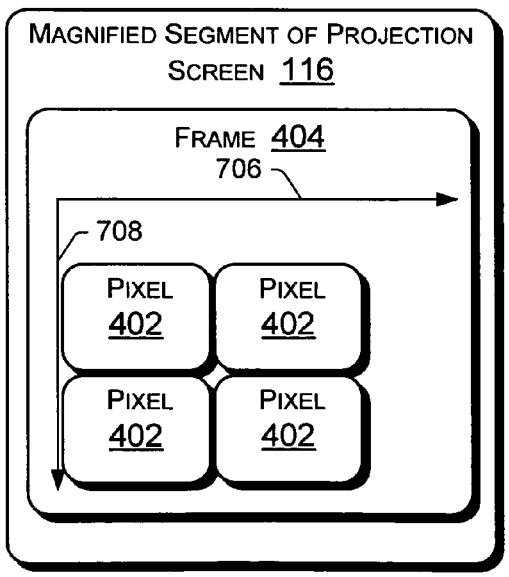
Fig. 7c  Fig. 7d

ENHANCED RESOLUTION PROJECTOR

BACKGROUND

Certain projector systems image a pattern from an imaged plane of an optical modulator. It is generally desired to improve the resolution of the projected images that are imaged from the optical modulator onto the projector screen; or alternatively to enhance the image to provide the viewer with the effect of improving the image. The maximum resolution of many conventional displays is a function of the dimension of the largest distinct optical unit such as a window unit or pixel that is contained in the optical modulator. The design associated with decreasing the physical dimensions of the pixels to improve resolution is relatively expensive and difficult for many projection screens. It is therefore desirable to provide a projector display having an enhanced resolution that does not involve the complexity or cost associated with reducing the size of the pixels.

BRIEF DESCRIPTION OF THE DRAWINGS

Illustrative and presently preferred embodiments of the invention are shown in the drawings, in which:

FIG. 3 shows a side cross-sectional view of one embodiment of a window segment of the optical modulator as shown in FIG. 2.

FIGS. 4a and 4b shows one embodiment of a wobulation technique as performed by the projector system of FIG. 1.

FIGS. 5a and 5b shows another embodiment of a wobulation technique as performed by the projector system of FIG. 1.

FIGS. 6a and 6b shows another embodiment of a wobulation technique as performed by the projector system of FIG. 1.

FIGS. 7a, 7b, 7c, and 7d shows an embodiment of a wobulation technique as performed by the projector system of FIG. 1.

The same numbers are used throughout the document to reference like components and/or features.

DETAILED DESCRIPTION

Within this disclosure, the term "projector system" includes, but is not limited to, displays and projectors such as high-definition televisions, video displays and projectors, and computer displays and projectors. enhancing the resolution of an image that is projected by a projector system onto a display screen or a projector screen generally increases the quality of the image that can improve the enjoyment of the viewers. This disclosure describes a number of wobulation techniques that can be applied to projector systems. Wobulation enhances the resolution of a projected image made up of one or more frames. Each frame is made up from an array of pixels. With one embodiment of wobulation, each pixel in a frame is offset by some fraction such as half of a pixel height and/or half a pixel width. This disclosure provides several embodiments of wobulation devices that can provide wobulation.

One embodiment of the projector system of the present disclosure includes an optical modulator that provides for optical wobulation.

Example Optical Projector System

Figure 1:
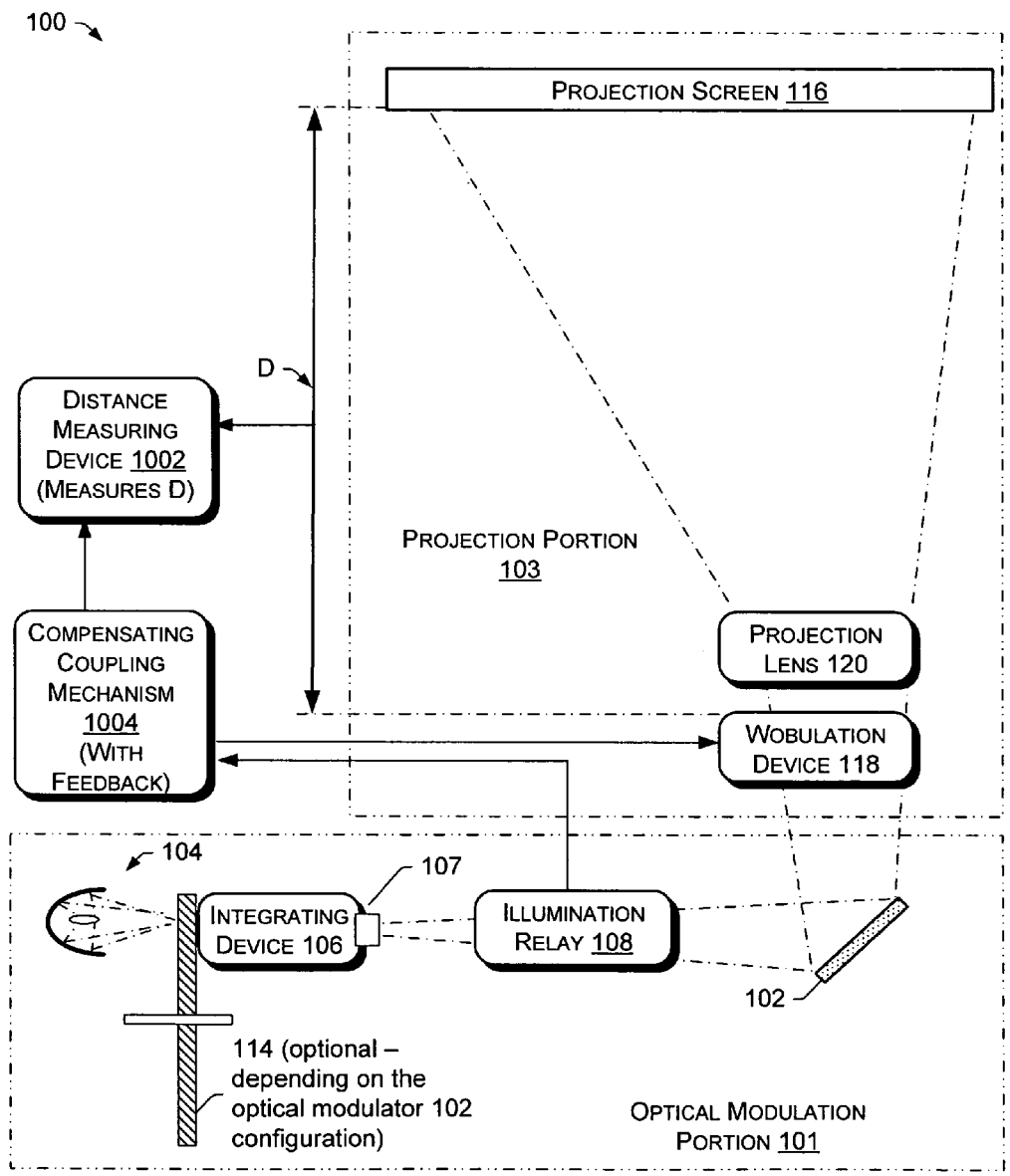
FIG. 1 is a schematic diagram of one embodiment of a projector system that includes a projector screen.

FIG. 1 is a top-view schematic diagram of an embodiment of an optical projector 100 that images an optical modulator 102 in a manner that provides wobulation to enhance the resolution of the image. In this embodiment, the projector system 100 includes an optical modulation portion 101 and a projector portion 103. The optical modulation portion 101 includes components that can allow the optical modulator 102 to image a two-dimensional image in the form of a two-dimensional illumination pattern in the form of one or more frames. The projection portion 103 images the light image from the optical modulator 102. The optical modulator of FIG. 1 is an interference-based reflective optical modulator such as a Fabry-Perot device. The operation and structure of conventional Fabry-Perot devices are generally understood.

Any type of optical modulator that modulates colors or bandwidths of light is within the scope of the claimed subject matter. For instance, in certain embodiments, the optical modulator 102 is a reflective device in which reflected light image from the optical modulator is imaged onto the projection screen. In other embodiment, the optical modulator 102 is a transmissive device in which the light image that passes through the optical modulator is imaged on to the projection screen.

One embodiment of the optical modulation portion 101 includes the optical modulator 102, a light source 104, an integrating device 106 including an integrating device exit 107, a color wheel 114 for certain embodiments of the optical modulation portion 101 as described herein, and an illumination relay 108. Light from the light source 104 passes through the integrating device 106, the color wheel 114, and the illumination relay 108 to the optical modulator 102. The integrating device 106 homogenizes the light, and directs the light into the illumination relay 108. The illumination relay 108 images a plane of the integrating device 106 to the optical modulator 102, in which the plane forms the output of the integrating device. The imaged plane takes the form of an illumination pattern at the optical modulator. The optical modulator creates a desired output image using modulation techniques using the light supplied by the illumination pattern.

Various embodiments of the integrating device 106 are formed as, but are not limited to, an integrating tunnel, a rod condenser lens, or a fly's eye condenser lens such as are commonly understood in the integrating device technologies. The integrating device 106 is formed with the integrating device exit 107 in the form of an aperture having a prescribed shape and an aspect ratio from which the integrated light that forms an image is directed.

While the embodiment of the projection portion 103 as shown in FIG. 1 is a front-lit projection system, it is to be appreciated and understood that the optical modulation portion 101 concepts disclosed herein are applicable to either front lit or back-lit projector systems, and are also applicable to either color or monochromatic projector systems.

Different embodiments of the optical modulation portion 101 can be used in conjunction with different embodiments of projection portions 103. The embodiment of the projection portion 103 of FIG. 1 includes a wobulation device 118, a projection lens 120, and the projection screen 116. The projection lens 120 images a plane representing the light output of the optical modulator 102 onto a destination location such as an optical projection screen 116. In different embodiments, the optical projection screen is configured as an optical projector as shown in FIG. 1 or as an optical display. The reflective and illuminated portion of the optical modulator is thereby projected as an image of the optical modulator on a viewing screen such as a back-lit or front-lit projection screen or display.

One application of the optical modulator 102 is for optical projection and displaying; such as used for home video projectors, theater projectors, High Definition Television (HDTV), etc. Various embodiments of optical modulators include, but are not limited to, digital micro-mirror device (DMD), liquid crystal display (LCD), and Liquid Crystal on Silicon (LCoS).

In general, optical modulators 102 operate by spatially distributing or filtering any incident light that is applied thereto. Several embodiments of the optical modulator 102 as described with respect to FIG. 2 consist of large number of window segments 202 that independently modulate light and create patterns or images; e.g., many optical modulators numerically contain tens, hundreds, thousand, or more window segments 202. Each window element may be associated with a fraction of, or one or more pixels, in the final image. All of the window segments 202 of the optical modulator 102 combine to create a planar active surface 204, for example, an imaged plane of the optical modulator 102 as illustrated within the dotted line referenced by the reference character 204. The planar active surface 204 represents the dimension of the entire image that has to be imaged through the wobulation device 118, the projection lens 120, and onto the projection screen. As such, each of these components and the combination of these components are configured to allow for a light path of a sufficient dimension to accommodate the dimension of the optical modulator 102 as characterized by the planar dimensions of the planar active surface 204 as shown by the H and W dimensions.

Different embodiments of the optical modulator 102 use different embodiments of window segments 202 to modulate light in different manners such as time modulation, phase modulation, frequency modulation, etc. In one embodiment, each window segment is always reflective, and each window segment is displaced between a first ON state in which the window segment acts to reflect light to the projection screen 116 and a second OFF state in which the window segment acts to apply its light to some location that is remote from the projection screen.

Example Optical Modulator

Figure 2:
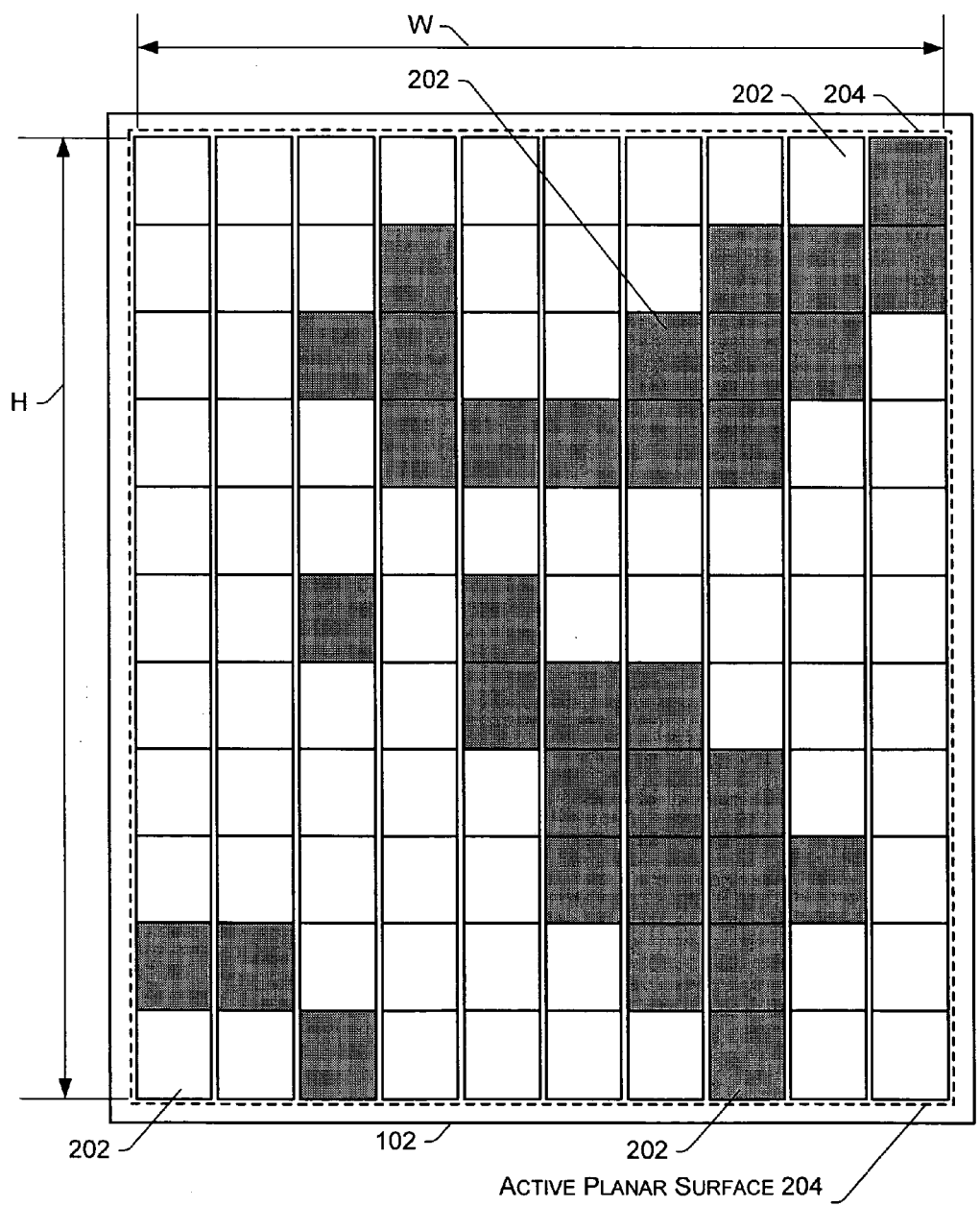
FIG. 2 is a front view of one embodiment of an optical modulator such as shown in FIG. 1.

For the embodiment of reflective optical modulators 102 as shown in FIG. 2, each window segment 202 is controllably altered between a reflective state and a transmissive state to generate a desired image. In the reflective state, light from that window segment 202 is directed to within the plane of the optical modulator to provide a brightly illuminated portion to be imaged by the projection portion 103. In the transmissive state, light from that window segment 202 is transmitted through the optical modulator away from the plane of the optical modulator to provide a darkly illuminated portion to be imaged by the projection portion 103 as shown by certain window segments being light and certain window segments being dark in FIG. 2. There is adequate spacing between the window segments 102 to allow individual relative tilting of each window segment.

Any other suitable embodiment of optical modulator 102 that has a modulating surface that modulates light is within the intended scope of the present disclosure. Optical modulation techniques include, but are not limited to, optical reflection, optical transmission, optical diffraction, optical polarization, changing of optical frequencies, changing of optical phase, and changing of frequency modulation, etc. that are within the intended scope of the present disclosure as modulation techniques as provided by the optical modulator 102. For example, diffractive light devices and digital mirror devices represent two conventional types of optical modulators that provide different modulation techniques.

In one embodiment, each window segment 202 of the optical modulator 102 is formed from a fully reflective material that is angled or displaced between multiple states. All of the window segments 202 are controllably displaced between a first position in which light from that window segment is directed towards the projection lens 120 as indicated by the bright window segments 202 in FIG. 2; or alternatively a second position in which light from that window segment is directed away from the projection lens 120 as indicated by the darkened window segments 202 in FIG. 2.

In one embodiment, to create color images using the optical modulator 102, at any instant of time the color of the lens of the color wheel 114 through which light passes on its way to the optical modulator is synchronized with the state of the optical modulator 102 for that color of light. The use of a color wheel 114 in the optical modulation portion 101 is a function of the type of optical modulator 102 that is used. For example, digital mirror devices (in which each pixel or sub-pixel mirror is angled to direct light of each different color at the projection screen) are one type of light modulator 102 that use color wheels to provide color to each image that is directed at the projection screen. Diffractive light devices (DLD) may not use color wheels in certain embodiments since each pixel or sub-pixel device can control the color of the light that it projects at the projection screen by itself.

With each modulated color image, the color of the lens of the color wheel 114 is synchronized with the state of the window segments on the optical modulator that corresponds to that color. As such, the color wheel 114, the illumination relay 108, and the optical modulator 102 together create an image of each color that appears on an output plane of the optical modulator 102 to be imaged by the projection portion 103. Each color is imaged for a brief duration, and then followed by another image that is projected in another color. The images that are projected for each color contribute to the total color of the color image. In this manner, images of the different colors are displayed on the projection portion 103 in a rapidly cyclical manner at such a rate that the cycling of the images for each of the different colors merges into the overall image, and the individual color images are not discernible by human eyes.

FIG. 3 shows a cross-sectional-view of one embodiment of the window segment 202 that forms one embodiment of the optical modulator 102 as described with respect to FIGS. 1 and 2. With certain embodiments of the optical modulator as shown in FIG. 3 that can produce variable colors by altering the distance 310, there is no need for the color wheel 114 as described with respect to FIG. 1. In other embodiments of the optical modulator as shown in FIG. 3, a color wheel can be used since altering the distance 310 allows for turning the optical modulator ON in which light is reflected or transmitted to the user, or turning the optical modulator OFF in which the light that would be directed to the viewer is absorbed. The embodiment of the window segment 202 includes a first reflector 302, a second reflector 304, and at least one flexure 306 that controls the relative position of the first reflector 302 and the second reflector 304. A window segment cavity 308 is formed between the first reflector 302 and the second reflector 304 such that the flexure 306 displacing the first reflector 302 with respect to the second reflector 304 acts to change the cross-sectional width 310 of the cavity 308.

In one embodiment, the first reflector 302 is partially reflective while the second reflector 304 is fully reflective. The partially reflective first reflector reflects from 10 to 90 percent of the light applied thereto. Some of the light applied to each window segment 202 as shown as 320 reflects, and constructively interferes with, light that passes through the first reflector 302 to the cavity 308, reflects off the second reflector 304, and returns to be transmitted through the first reflector 302 as shown as 322. Such cyclic trips across the cavity 308 as shown by the path 324 can be performed once, twice, or multiple times for some of the light within the cavity before the light returns through the first reflector 302 as shown by 322. The colors of light that are reflected from the first reflector 302 that constructively interferes, and is therefore visible, with the light that is returned from reflecting off the second reflector 304 has a bandwidth that is some multiple of the cross-sectional width 310 of the cavity 308. Those bandwidths of the light that are reflected from the first reflector 302 that destructively interfere are not visible. The bandwidth of the light that destructively interferes is not some multiple of the dimension of the cross-sectional width 310 of the cavity 308. Such constructive interference and destructive interference as associated with Fabry-Perot devices is generally understood, and is not further detailed in this disclosure.

Example Wobulation Techniques

The wobulation device 118 acts to offset, or spatially shift, each pixel of a frame 404, that contributes to forming an image on the projection screen, to provide an enhanced resolution which is being imaged onto the projection screen 116. The translation of the pixels of the frame between an original pixel location 406 and an offset pixel location 408 is indicated by the arrow 410 on the projection screen 116 between FIGS. 4a and 4b. Within this disclosure, the term "pixel" relates to any instantaneous region that is being imaged on the projection screen at which a substantially uniform color and illumination is being instantaneously applied. Typically, the pixel 402 forms a much smaller percentage of the area of the frame 404 than shown in FIGS. 4a and 4b, but these dimensions are exaggerated in the figures for ease of display. Each pixel 402 displayed on the projection screen is desired to be sufficiently small to be indistinguishable from adjacent pixels to the viewers. After the offset of the one pixel 402 across the projection screen, a number of similar offset movements of the pixel are provided that follow a regular pattern until the pixel is returned to the original location on the projection screen 116. This wobulation cycle is repeated at a sufficiently high rate to be indistinguishable by human eyes.

In one embodiment, each pixel is offset by a prescribed percentage (e.g., half) of a total dimension of the pixel in the direction of the offset. In one embodiment, a pixel corresponds to one picture element as it appears instantaneously on the projection screen. In another embodiment, each pixel represents a somewhat arbitrary region within the image that is formed on the projection screen for a brief duration. The offset of the pixels is in the horizontal direction as indicated in FIGS. 4a and 4b, in the vertical direction as indicated in FIGS. 5a and 5b, or along a diagonal as indicated in FIGS. 6a and 6b. In another embodiment, each pixel is displaced in a progression of directions such as to the right by half the width of a pixel, down by half the height of a pixel, to the left by half the width of a pixel, and finally upward to its starting point. In such a cycle of pixel displacements, the entire cycle has to be repeated in a time that is unperceivable to the human eye.

As shown in FIGS. 4a and 4b, the pixel is offset by half of its horizontal dimension on the projection screen 116 as shown on FIG. 1. Pixels 402 can be configured with different dimensions depending upon the projection system. For different embodiments of the digital light projector (DLP) based optical modulators, the pixel as projected on the projection screen is square, rectangular, or some other configuration. In one embodiment, after the pixel is horizontally displaced as shown between the position shown in FIG. 4a to FIG. 4b across the projection screen, the pixel is cycled back into its original position as shown in FIG. 4a. Within this disclosure, the term "cyclical" pixel motion relates to that pixel motion that starts at one location and repeatedly translates to one or more other offset locations, and then returns to the original pixel location. Such cyclical pixel wobulation motions as described in this disclosure can be along a single axis, triangular, rectilinear, circular, oval, or in some other geometric configuration. The more complex wobulation motions will require more offset pixel locations. During a given wobulation motion, each pixel within the frame undergoes a similar motion.

As shown in the wobulation motion of FIGS. 5a and 5b, the pixel is offset by half of its vertical dimension across the projection screen 116 as shown on FIG. 1. In one embodiment of the wobulation motion, after the pixel is vertically displaced as shown between the position shown in FIGS. 5a and 5b, then the pixel is cycled back into its original position as shown in FIG. 5a. The concepts of the pixel displacements in the vertical direction to provide wobulation as shown with respect to FIGS. 4a and 4b can be applied to displacement in the vertical direction as shown in FIGS. 5a and 5b, or along a diagonal as shown in FIGS. 6a and 6b.

The displacement of pixels of the frame in another embodiment of the wobulation motion is along a diagonal as described with respect to FIGS. 6a and 6b shows an offset that has both a horizontal and a vertical component. In the wobulation motion, after a pixel is diagonally displaced as shown between the position shown in FIGS. 6a and 6b, then the pixel is cycled back into its original position as shown in FIG. 6a. While the figures describe wobulation as involving pixel overlap displacements of a dimension equal to half a pixel, it is also envisioned that other overlaps such as a third or a quarter of the dimension of the pixel are possible. With such fractional pixel overlaps, a number of pixels corresponding to the reciprocal of the fractional overlap is used. For example, wobulation using three pixel positions uses a third of a pixel overlap displacement between each successive pixel.

While the pixel displacements of FIGS. 4a and 4b; FIGS. 5b and 5c; and 6a and 6b show the displacement of a single pixel 402, it is to be understood that the wobulation provides an enhanced resolution for an image made up of any number of pixels. For example, the image on the projection screen is made up of in the tens, hundreds, thousands, or even millions of pixels that form the image. FIGS. 7*a*, 7*b*, 7*c*, and 7*d* show a wobulation pattern in which four illustrative pixels 402 follow a wobulation motion that is characterized by a cyclic pattern relative to a fixed location as indicted by a fixed coordinate axis 706, 708 on the projection screen 116. Many embodiments of wobulation thereby involve a large number of pixels that are projected on the projection screen to form the image 404. The simultaneous wobulation pattern of the multiple pixels thereby follows a similar wobulation path that repeats itself at a high rate.

In one embodiment of wobulation motion, each pixel of a frame contains a uniform color or bandwidth of light at any given time. Wobulation may involve maintaining a constant color for the overlap pixels, or changing the color pixels as a result of the slightly different position of the overlapped pixel depending upon the algorithm used. As the pixel is offset into an offset position in certain embodiments, the bandwidth of light may be varied depending upon the offset light at the offset location for that particular pixel. As such, a certain percentage of the pixels will be changing their color or bandwidth during the wobulation to more accurately provide the color of the offset pixel location. In other embodiments, the colors of the pixels are maintained as they follow the wobulation path. As such, the wobulation provides a technique to enhance the resolution by two or four times depending upon the wobulation pattern.

Wobulation makes the resultant image appear more natural since it reduces the occurrence of artificial appearing rectangular boundaries such as occur with certain conventional pixilated images. The occurrence of the pixel boundaries appearing on the image is reduced because the pixel boundaries shift from the wobulation. The displacements of the pixels in their overlapping motion during wobulation tends to hide these rectangular boundaries.

Example Wobulation Device

A number of wobulation devices 118 are describe that can each provide a wobulation motion to the pixels within a frame as described above. One embodiment of the wobulation device 118 that can provide offset such as used for wobulation along a single axial direction is described with respect to FIG. 8. The wobulation device 118 includes a first mirror 802 that is fixed at a fixed location 804, and a second mirror 806 that is displaced by an actuating device 808. The respective mirrors 802 and 806 include respective reflective surfaces 810 and 812. The individual mirror surfaces may be planar, curved, or some other shape. The two mirror surfaces may or may not be maintained to be parallel to each other. In case the two mirror surfaces are held parallel, the beam coming from the optical modulator is only spatially offset without changing its angle. If the two mirrors 802 and 806 are not parallel, the beam is spatially as well as angularly offset. This will offset the entire projected image angularly which may be a desirable feature for some projectors. The reflective surfaces 810 and 812 of the mirrors are sufficiently spaced to not interfere with the optical path of light from the optical modulator 102 to the projection lens 120 and the projection screen 116. The mirrors 802 and 806 of the wobulation device 118 are sufficiently large to reflect the entire image that is being imaged from the optical modulator 102 onto the projection screen 116.

Figure 8:
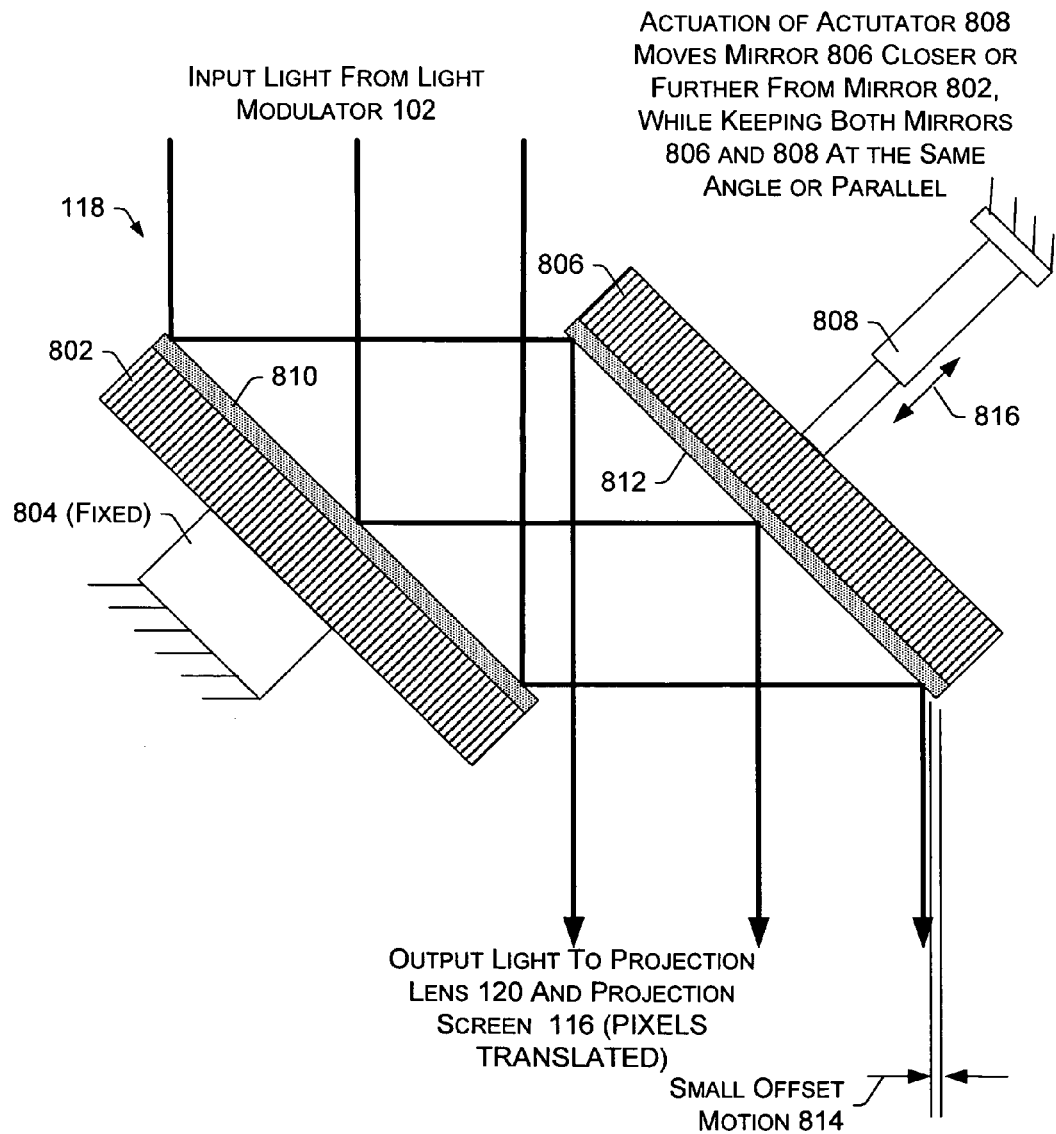
FIG. 8 shows a cross-sectional diagram of one embodiment of a wobulation device that can perform wobulation along one axis.

The actuating device 808 of the wobulation device 118 is configured as any device that provides linear motion of at least one of the mirrors 802, 806 with respect to the other mirror, for example using a piston, a track, a push-pull mechanism, or a linear slide. The larger variety of precise linear actuating devices 808 are generally well known, and each distinct linear actuating device will not be further illustrated or described. Whether the actuating device 808 is applied to the first mirror 802, the second mirror 806, or both mirrors 802 and 806 is arbitrary. An offset distance 814 is shown in FIG. 8 that corresponds to the distance that the pixels 402 are offset as described with respect to FIGS. 4*a* and 4*b*; FIGS. 5*a* and 5*b*; FIGS. 6*a* and 6*b*; and FIGS. 7*a*, 7*b*, 7*c*, and 7*d*. Each wobulation device 818 is capable of offsetting the pixels within the frame only along a single axis that is parallel to the plane forming the projection screen 116. As such, in those instances that it is desired to provide a pixel offset along two axes, then two wobulation devices that each provide an offset in two orthogonal directions are used. The two orthogonally mounted wobulation devices are sequenced to provide the desired rectangular motion to the pixels as described with respect to FIGS. 7*a*, 7*b*, 7*c*, and 7*d*.

The direction of travel of the actuating device 808 that provides for the offset is shown in FIG. 8 by the arrow 816. As such, actuating the actuating device 808 provides the offset to the mirrors 802, 806 by displacing at least one of the mirrors in a direction substantially perpendicular to the respective reflective surfaces 810 and 812 as indicated by the arrow 816.

In the embodiment of the wobulation device 118 as described with respect to FIG. 8, the actuating device is displaced on the opposed side of the mirror 802 from the reflecting surface 810. As such, the actuating device does not physically obstruct the optical path that extends from the optical modulator 102 via the wobulation device 118 and the projecting lens 120 to the projection screen 116. This embodiment of the wobulation device 118 thereby does not have to be configured to compensate for any interference of the optical path within the wobulation device. While one embodiment of the wobulation device 118 is described with respect to FIG. 8, it is to be understood that any mechanism that can displace the pixels within a frame by some offset distance in a repetitive motion across a projection screen 116 as shown in FIG. 1 is within the intended scope of the present disclosure.

Wobulation requires a precise spatial offset of the image in the pixels at the projected screen. As described in this disclosure, wobulation can be caused by either shifting one mirror of the wobulation device as shown in FIG. 8, or by angling one mirror of the wobulation device as shown in FIG. 9.

Figure 9:
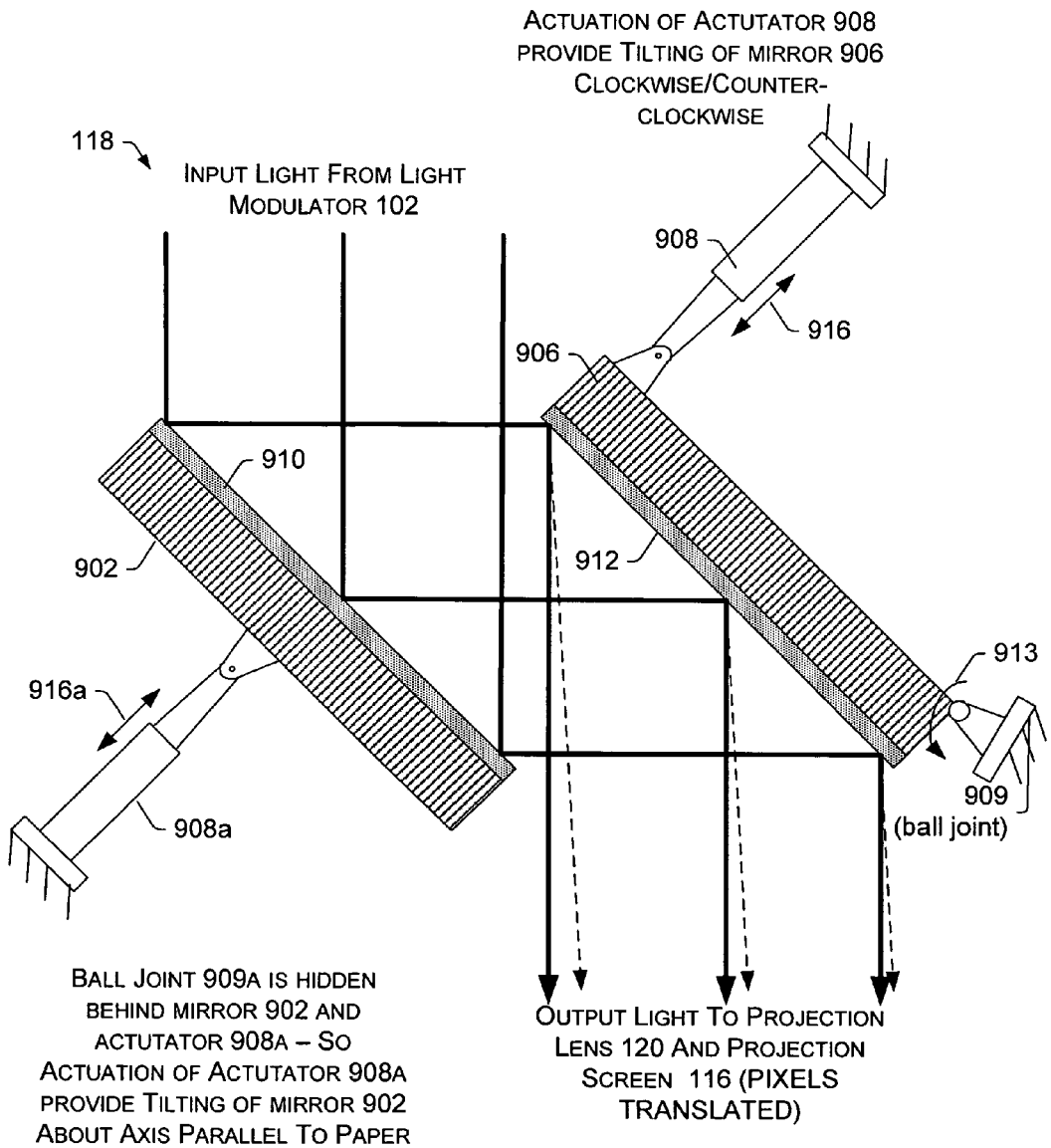
FIG. 9 shows a cross-sectional diagram of another embodiment of a wobulation device from that shown in FIG. 8.

FIG. 9 provides one embodiment of a wobulation device 118 that can provide a wobulation motion of the pixels as projected on the projection screen along two orthogonal directions. The wobulation can also be achieved as shown in FIG. 9 that when actuated uses an appropriate actuator 908 to angle the mirror 906 about a pivot 909 such as a ball joint. In addition, an actuator 908*a* angles the mirror 902 about a pivot 909*a* such as a ball joint. The actuator 908*a* reciprocating in direction 916*a* is shown as extending in a plane of the paper. The ball joint 909*a* is hidden behind the mirror 902 as seen in FIG. 9. As such, when the actuator 908*a* is actuated, the mirror 902 is rotated in a plane parallel to the paper about the pivot 909*a*. The mirrors 902 and 906, with reflective surfaces 910 and 912, respectively, are mounted to rotate about respective pivots 909, 909*a* about two respective axes to provide wobulation motion as projected onto the projection screen in orthogonal directions. As such, it is possible to provide two-axis wobulation motion by tilting each mirror of a two-mirror pair about respective orthogonal axes as shown in FIG. 9. By providing wobulation along two orthogonal axes, rectilinear wobulation motion of the pixels of the frame as shown in FIGS. 7a, 7b, 7c, and 7d is possible.

The operation of the actuators 908a and 908 are now described with respect to only one of the actuators 908. The displacement of the actuator 908, as shown by an arrow 916, causes the mirror 906 to rotate about the pivot 909 as shown by the arrow 913. For instance, assuming that the actuator 908 is applied to a remote location on the rectangular mirror 906 from the joint 909, then the reciprocating displacement of the actuator 908 in the direction as indicated by the arrow 916 provides a clockwise/counter-clockwise motion of the mirror 906 as shown in FIG. 9, and a motion of the front of the mirror with respect to the rear of the mirror in a direction parallel to the arrow 916 as shown in FIG. 9. The clockwise/counter-clockwise motion of the mirror 906 causes displacement of the output light that is directed to the display screen is shifted by some angle as shown by the dotted lines from the original un-shifted light that is shown in solid. This shifting of the output light produces the wobulation. The wobulation mechanism that tilts the mirror 906 allows a wobulation device to achieve one axes wobulation since a single actuator mounted as shown in FIG. 9 can tilt the mirror along one axes.

Angling one mirror provides the translational spatial offset as shown in FIG. 9. The spatial offset distance along the projection screen is a function of the angle that the mirror is angled and the distance between the wobulation device 118 and the projection screen 116. For example, for a given mirror angle, increasing the distance between the wobulation device 118 and the projection screen 116 by some multiple X causes the spatial offset to be enhanced by the quantity X as well.

In those wobulation mechanisms 118 that angles at least one of the mirrors as described with respect to FIG. 9 (instead of a translating one of the mirrors as shown in FIG. 8), results in a spatial offset at the projected screen that is a function of the distance between the screen and the mirror. To ensure that the wobulation overlap is at the desired value, the distance between the wobulation device 118 and the projection screen 116 has to be known.

FIG. 1 includes a modification to the projection portion 103 of FIG. 1 that compensates for the distance between the wobulation device 118 and the projection screen 116 that includes a distance measuring device 1002 and a compensating coupling mechanism 1004 as shown with respect to FIG. 1. The distance measuring device 1002 measures a distance between the wobulation device 118 and the projection screen 116. The compensating coupling mechanism 1004 sets the angle of the mirror 912 at a desired angle to provide the desired offset for the wobulation based on the configuration of the actuating device 908 and the mirror 906 as shown in FIG. 9. In other words, the greater the distance D as shown in FIG. 1, the less the reflective plates of the wobulation device 118 have to be angled to provide wobulation of the desired offset distance.

The actuating device 908 as shown in FIG. 9 is therefore controlled using the compensating coupling mechanism 1004 to adjust the magnitude of the mirror tilt. The wobulation device 118 is configured to compensate for any change in zoom or focus that occurs in the illumination relay 108 such that the spatial offset in the projected pixels remain constant. In one embodiment, the compensating coupling mechanism 1004 receives feedback that is located between a lens focus and a zoom contained in the illumination relay 108 of FIG. 1. The compensating coupling mechanism 1004 can be hardware, software, or firmware-based. The compensating coupling mechanism 1004 may therefore be considered as providing a feedback loop between the zoom and focus position of the illumination relay 108 that corresponds to the projection lens 120 such that the tilt magnitude of the wobulating mirror is accurately tilted as a function of the distance between the wobulation device 118 and the projection screen 116.

As described above, the embodiment of wobulation device 118 as described with respect to FIG. 8 spatially shifts the projected location of the pixels across the display to provide one-axis wobulation by actuating actuator 808 and displacing one mirror 806 with respect to another mirror 802 while keeping both mirrors substantially parallel. The embodiment of wobulation device 118 as described with respect to FIG. 9 spatially shifts the projected location of the pixels across the display to provide two-axis wobulation by actuating the respective actuators 908 and 908a to angle the mirrors 906 and 902. Each wobulation device acts to translate the pixels of a frame in a projected image from the wobulation device across the projection screen.

Figure 10:
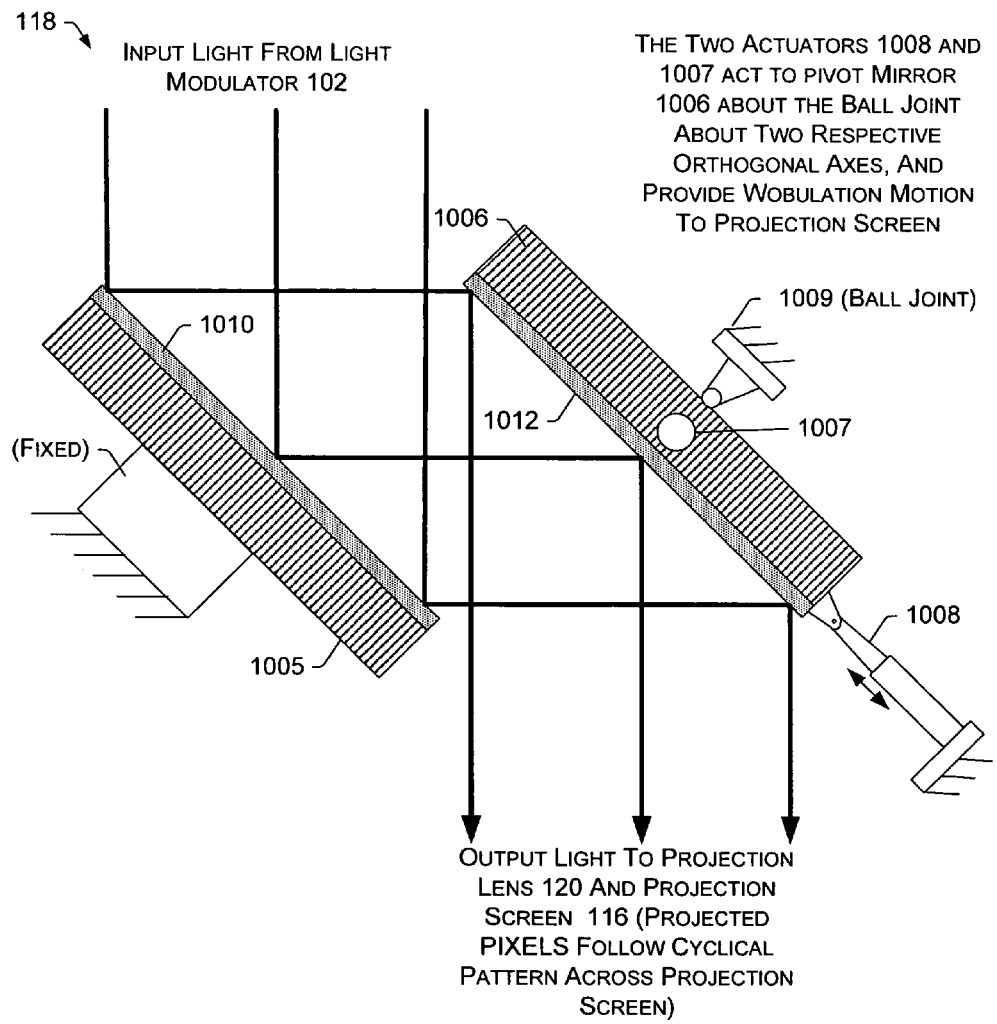
FIG. 10 is a schematic diagram of another embodiment of a projector system that includes a projector screen from that shown in FIG. 1.
Figure 11A:
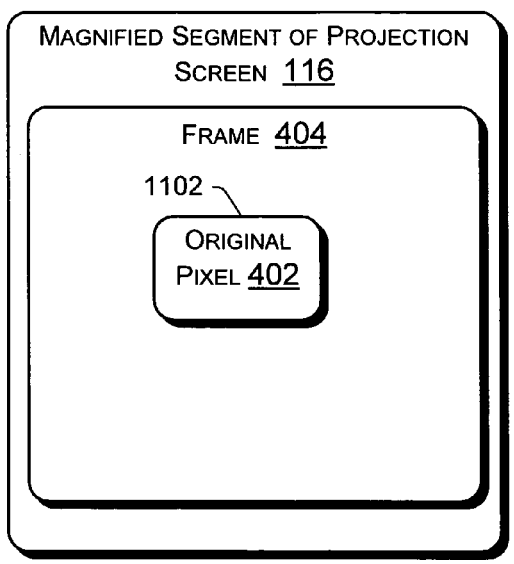
FIGS. 11a and 11b shows one embodiment of a cyclical spatial offset wobulation technique as can be performed by the projector system of FIG. 10.
Figure 11B:
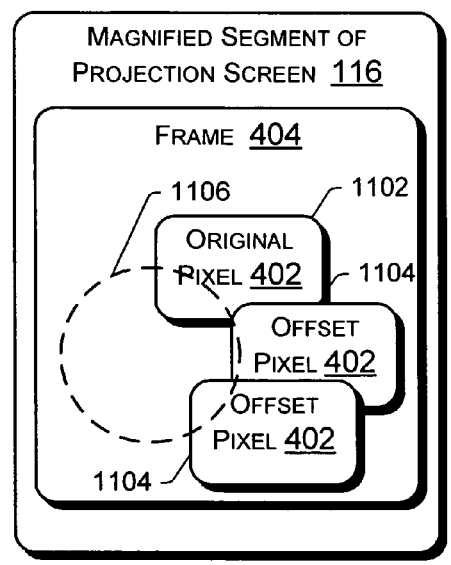

Another wobulation technique provides circular or oval cyclical spatial offset as shown in FIG. 11 as provided by a projector system as shown in FIG. 10, the wobulation occurs by translating the offset pixels to a larger number of pixel locations across the display screen than the two or four offset pixel locations that are described with respect to FIGS. 4a and 4b; FIGS. 5a and 5b; FIGS. 6a and 6b; and FIGS. 7a, 7b, 7c, and 7d. For example, a wobulation motion can be produced if each pixel in a frame translates on a projection screen 116 about a pattern that forms a circle 1106 to five or more offset pixel locations shown as 1102 and 1104 in FIG. 11b. While only three different pixel locations are shown for ease of display in FIG. 11b, more pixel locations are provided about the circular or oval pattern 1106 to form a substantially circular or oval wobulation pattern. Cyclical spatial offset requires a sufficient precision of motion in the plane of the projection screen to effect such cyclical translation. When each pixel in the frame is translated across the screen in a cyclical pattern, the rectangular pixel images (e.g., of the same color) that appear on conventional projection screens are less detectable, and the image appears more realistic and life-like. The resolution of the projected image into the projection screen is enhanced with the cyclical spatial offset in a similar manner as with other wobulation techniques.

To provide the cyclical spatial offset as shown in FIG. 10, a ball joint 1009 is mounted to the substrate of a mirror 1006 to allow rotation of the mirror along two orthogonal axes with respect to the mirror 1005. Two actuators 1008, 1007 are both mounted to be offset from the mounted location between the ball joint 1009 and the mirror 1006. The actuator 1007 is shown in FIG. 10 as being in front of, and below, the ball joint 1009 to provide rotation of the mirror 1006 about a plane parallel to the paper. The actuator 1008 extends below of, and to the right of the ball joint 1009 in FIG. 10. Actuation of the actuator 1008 rotates the mirror 1006 about an axis of the ball joint 1009 that extends into and out of the paper. As such, displacement of the actuators 1008 and 1009 rotate the mirror 1006 about the ball joint 1009 in a pattern that translates the projected pixels through a sufficient number of offset pixel locations to form a cyclical or other curvilinear motion that is parallel to the plane formed by the projection screen. Mirrors 1005 and 1006 have reflective surfaces 1010 and 1012, respectively. Any actuator configuration that provides tilting of the mirror 1006 along two orthogonal axes that are parallel to the original un-tilted plane of the mirror is within the intended scope of the present disclosure.

The cyclical spatial offset wobulation techniques results in similar wobulation effects that reduce the appearance of the pixel boundaries on the projection screen to produce a more life-like image as with the other translational wobulation techniques as described above with respect to FIGS. 4a and 4b; 5a and 5b; 6a and 6b; and 7a, 7b, 7c, and 7d.

CONCLUSION

This disclosure thereby provides a projection display that allows for wobulation of pixels 402 as they appear for a brief duration on a projection screen using a wobulation device 118. The wobulation device 118 provides a cyclical offset using a multiple mirror system. Having herein set forth preferred embodiments of the present invention, it is anticipated that suitable modifications can be made thereto which will nonetheless remain within the scope of the present invention.

What is claimed is:

1. A light projecting device, comprising:
   an image resolution enhancing mechanism that spatially offsets at least one pixel between an original pixel position and an offset pixel position in a temporally repetitive fashion, wherein the image resolution enhancing mechanism includes a dual mirror mechanism to provide the spatial offset in a spatially repetitive fashion; and
   wherein the dual mirror mechanism includes a first mirror and a second mirror, and wherein the first mirror is displaced with respect to the second mirror to alter a mirror offset position between the first mirror and the second mirror in which the dual mirror mechanism includes a linear slide.

2. The light projecting device of claim 1, wherein the spatial offset of the pixel results from adjusting the distance between the first mirror and the second mirror.

3. The light projecting device of claim 1, wherein the spatial offset of the pixel includes a sequence of spatial offsets.

4. The light projecting device of claim 3, wherein the spatial offset is translational across a projection screen.

5. A light projecting device, comprising:
   an image resolution enhancing mechanism that spatially offsets at least one pixel between an original pixel position and an offset pixel position in a temporally repetitive fashion, wherein the image resolution enhancing mechanism includes a dual mirror mechanism to provide the spatial offset in a spatially repetitive fashion;
   wherein the dual mirror mechanism includes a first mirror and a second mirror, and wherein the first mirror is displaced with respect to the second mirror to alter a mirror offset position between the first mirror and the second mirror wherein the spatial offset of the pixel results from adjusting the angle between the first mirror and the second mirror; and
   a coupling mechanism that derives a tilt magnitude of the first mirror as a function of the distance between the first mirror and a projection screen.

6. The light projecting device of claim 5, wherein the spatial offset is angular across the projection screen.

7. The light projecting device of claim 5, further comprising a mirror displacement device that angles the first mirror with respect to the second mirror.

8. A light projecting device, comprising:
   an image resolution enhancing mechanism that spatially offsets at least one pixel between an original pixel position and an offset pixel position in a temporally repetitive fashion, wherein the image resolution enhancing mechanism includes a dual mirror mechanism to provide the spatial offset in a spatially repetitive fashion; and
   wherein the dual mirror mechanism includes a first mirror and a second mirror, and wherein the first mirror is displaced with respect to the second mirror to alter a mirror offset position between the first mirror and the second mirror in which the dual mirror mechanism acts along an axis that is substantially perpendicular to both a reflective surface of the first mirror and a reflective surface of the second mirror.

9. An apparatus, comprising:
   a wobulation means including a first mirror and a second mirror for spatially offsetting at least one pixel from an original pixel position by some fraction of the pixel across a projection screen to a spatial offset position, wherein the spatial offset is performed cyclically with a spatial return in which the pixel is returned from the spatial offset position to the spatial return position; and
   an actuator means for displacing the first mirror with respect to the second mirror, in which the mirror actuator is remote from the optical path and includes a linear slide.

10. The apparatus of claim 9, wherein the spatial offset of the at least one pixel is a translation motion in a direction parallel to the projection screen.

11. An apparatus, comprising:
    a wobulation means including a first mirror and a second mirror for spatially offsetting at least one pixel from an original pixel position by some fraction of the pixel across a projection screen to a spatial offset position, wherein the spatial offset is performed cyclically with a spatial return in which the pixel is returned from the spatial offset position to the spatial return position;
    an actuator means for displacing the first mirror with respect to the second mirror, in which the mirror actuator is remote from the optical path and wherein the spatial offset of the at least one pixel is angled motion within a plane parallel to the is projection screen; and
    a compensating coupling mechanism that adjusts for the distance between the wobulation means and the projection screen.

12. The apparatus of claim 11, wherein the spatial offset of the at least one pixel includes a cyclical spatial offset wherein the pixel is angled in a plane that is parallel to the plane of the projection screen.

13. The apparatus of claim 11, wherein the actuator means angles the first mirror with respect to the second mirror.

14. An apparatus, comprising:
    a wobulation means including a first mirror and a second mirror for spatially offsetting at least one pixel from an original pixel position by some fraction of the pixel across a projection screen to a spatial offset position, wherein the spatial offset is performed cyclically with a spatial return in which the pixel is returned from the spatial offset position to the spatial return position;
    is an actuator means for displacing the first mirror with respect to the second mirror, in which the mirror actuator is remote from the optical path and acts along an axis that is substantially perpendicular to both a reflective surface of the first mirror and a reflective surface of the second mirror.

15. A light projecting device, comprising:
    an optical modulator that modulates light onto a display screen;

an image resolution enhancing mechanism that spatially offsets at least one pixel between an original pixel position and an offset pixel position in a temporally repetitive fashion, wherein the image resolution enhancing mechanism includes a dual mirror mechanism to provide the spatial offset of the at least one pixel across the display screen in a spatially repetitive fashion; and a coupling mechanism that derives a tilt magnitude of the first mirror as a function of the distance between the first mirror and the display screen;

wherein the dual mirror mechanism includes a first mirror and a second mirror, and wherein the first mirror is rotated with respect to the second mirror to alter the spatial offset of the pixel across the display screen.

* * * * *